(12) United States Patent
Taylor

(10) Patent No.: US 8,100,645 B2
(45) Date of Patent: Jan. 24, 2012

(54) AXIAL FLOW IMPELLER

(75) Inventor: James Watt Taylor, Dunfermline (GB)

(73) Assignee: Qinetiq Limited, London (GB)

( * ) Notice: Subject to any disclaimer, the term of this patent is extended or adjusted under 35 U.S.C. 154(b) by 685 days.

(21) Appl. No.: 12/300,960

(22) PCT Filed: Apr. 26, 2007

(86) PCT No.: PCT/GB2007/001536
§ 371 (c)(1),
(2), (4) Date: Nov. 14, 2008

(87) PCT Pub. No.: WO2008/001032
PCT Pub. Date: Jan. 3, 2008

(65) Prior Publication Data
US 2009/0123281 A1    May 14, 2009

(30) Foreign Application Priority Data

Jun. 30, 2006 (GB) .................................. 0613012.4

(51) Int. Cl.
*F03B 1/00* (2006.01)
*F04B 49/00* (2006.01)
(52) U.S. Cl. ...................................... 415/220; 417/307
(58) Field of Classification Search .............. 416/227 R, 416/231 R, 231 A, 181, 182, 183, 185, 232, 416/233; 415/220, 181, 91
See application file for complete search history.

(56) References Cited

U.S. PATENT DOCUMENTS

| | | | |
|---|---|---|---|
| 1,793,179 A | 6/1927 | Lanterman et al. | |
| 2,655,310 A * | 10/1953 | Schlumbohm | 415/90 |
| 5,755,557 A | 5/1998 | Alizadeh | |
| 2004/0184914 A1 | 9/2004 | Doege et al. | |
| 2007/0177349 A1 * | 8/2007 | Pokharna et al. | 361/696 |

FOREIGN PATENT DOCUMENTS

| | | |
|---|---|---|
| EP | 0 761 979 A1 | 3/1997 |
| GB | 574531 | 1/1946 |
| GB | 2 062 118 A | 5/1981 |
| WO | WO 02/20947 A1 | 3/2002 |

* cited by examiner

*Primary Examiner* — N Drew Richards
*Assistant Examiner* — Khalid Ahmed
(74) *Attorney, Agent, or Firm* — Oliff & Berridge, PLC

(57) ABSTRACT

A low noise axial flow impeller has a multi cellular form of construction comprising a multiplicity of individual axial flow channels disposed in a circumferential and radial array with respect to the axis of rotation. This increases the "blade passing frequency" as compared to a conventional impeller and since higher frequencies have lower energy for a given flow output the total amplitude of the noise generated can be reduced. For high total flow area coupled with low structural weight the channels are arranged in tessellating rings of equal numbers of channels, with channel cross sections based on hexagons (or truncated hexagons in the case of the channels in the innermost and outermost rings). In another embodiment each channel also extends from a respective channel inlet to a respective channel outlet which is offset from the respective inlet in the radial direction of the impeller, and involves an increase in the internal dimension of the respective channel in the direction radial to the axis of rotation, thus assisting deceleration and compression of the air or other medium being conveyed as it flows through the channels.

16 Claims, 3 Drawing Sheets

AXIAL FLOW IMPELLER

The present invention relates to rotary impellers used in fluid-dynamic machines for moving and/or compressing gases or liquids or other fluent materials, such as fans, blowers, propellers, pumps and compressors, and more particularly is concerned with the production of low noise levels by such devices. Most machines of this kind fall within one of two main classes, namely axial flow machines where the overall direction of flow of fluid through the impeller is generally parallel to its axis of rotation, and centrifugal machines where the overall direction of flow of fluid through the impeller is generally radial to its axis of rotation. It is to the former class that the present invention is directed.

The impeller is a significant source of noise in such machines, the noise from the impeller being caused by the repeated exit of fluid from the individual blades (tonal noise) and the turbulent passage of the fluid over the blades (broadband noise). There exists a clear market drive for lower noise machines, beyond the requirements of current legislation. For example low noise levels are used as positive selling points in relation to vacuum cleaners, hairdryers, cooker hoods, air conditioning units and other domestic appliances where noise is dominated by the aerodynamic sources. Similarly there is a demand for quieter cooling fans in compact electronic equipment, particularly computers, where there is already a market for replacement fans with lower noise levels and noise absorption kits. Another market exists for lower noise propulsion units for air and water vehicles. Impellers according to the invention may find application in all of these markets, or more generally in axial flow machines where there is a desire for lower noise operation.

In a traditional bladed impeller each individual blade compresses a volume of fluid which contributes to the total flow through the machine. The presence of static parts in the vicinity of the impeller, such as stator vanes in an axial configuration, causes a disruption to the pressurised working fluid and the resultant pressure wave is evident as noise either in the fluid itself or emanating from the body of the machine. The frequency of noise created in this way is known as the blade passing frequency and is dependent on the number of blades in the impeller and the number of significant static features at the exit from the impeller.

The present invention is predicated upon replacing the traditional bladed impeller with a multi-cellular form of construction with the impeller comprising a multiplicity of individual axial flow channels disposed in a circumferential and radial array with respect to the axis of rotation of the impeller. This dramatically increases the equivalent number of "blades" passing the static features and correspondingly raises the frequency of the tonal noise generated. For a given flow output, higher frequencies have lower energy and hence the total amplitude of the noise generated should be reduced.

An axial flow impeller having a construction as described above (hereinafter referred to as "an impeller of the kind stated") is disclosed and illustrated in a schematic manner in US2004/0184914. More particularly US2004/0184914 describes impellers where the flow channels are formed in a succession of coaxial rings by winding a tape with prefabricated struts. All of the channels in a respective impeller are of the same cross-sectional shape and dimensions with the consequence that the number of channels accommodated in a ring increases with increasing ring radius (i.e. more channels in the outer rings than the inner rings) and the channels in each ring are offset in the circumferential direction from the channels in the adjoining rings. We consider the circumferential offset to be of advantage from the point of view of noise generation as it reduces the number of channels passing the same static feature at any instant and further breaks up the fluid flow which reduces the generation of discrete tones and distributes the noise over a wider range of frequencies. However this form of construction imposes undesirable constraints on the overall geometry of the channel array and the selection of individual channel forms in different rings.

The present invention, on the other hand, resides in one aspect in an impeller of the kind stated wherein the array of flow channels is in the form of a radial succession of coaxial rings of such channels, with the channels in each such ring being offset in the circumferential direction from the channels in the adjoining ring(s), and with the same number of channels in each such ring.

More particularly the present invention allows a construction where the rings of flow channels tessellate in the radial direction and in a particularly advantageous embodiment the cross-sectional shapes of the channels are based on hexagons (or truncated hexagons in the case of the channels in the innermost and outermost rings). This provides an inherently strong structural form with a high area efficiency for fluid flow, allows a natural offset for the channels in adjoining rings, provides "flat" radial faces for working the fluid, and is more efficient than, say, circular or elliptical channels in terms of structural weight and flow area. Other cross-sectional forms may, however, be adopted if desired. For example a channel form based on quadrilaterals would provide a slightly higher area efficiency at the expense of some structural strength for a given wall thickness, and could therefore be more suited to lower load applications.

The number of flow channels in each ring is preferably a prime number, to reduce the formation of harmonics of the blade passing frequency in the noise spectrum.

In another aspect the invention seeks to provide an impeller of the kind stated with an enhanced fluid dynamic performance. In this respect the efficient transfer of momentum to the fluid in the rotating impeller requires an increase in the available flow area along the length of the flow channels. In the axial flow impeller of US2004/0184914 some increase in the available area of each channel will be achieved by virtue of the width of each channel in a circumferential "plane" increasing in accordance with the fluid dynamic profile along the length of the channel. In accordance with a feature of the present invention, however, a further increase in the available flow area can be achieved by configuring flow channels so as to provide an increase in a dimension in an orthogonal direction.

The invention therefore also resides in an impeller of the kind stated wherein at least a plurality of the channels are configured to extend from a respective channel inlet to a respective channel outlet which is offset from the respective inlet in the radial direction of the impeller, and involve an increase in the internal dimension of the respective channel in the direction radial to the axis of rotation of the impeller.

These and other features of the present invention will now be more particularly described, by way of example, with reference to the accompanying drawings, in which.

Figure 1:
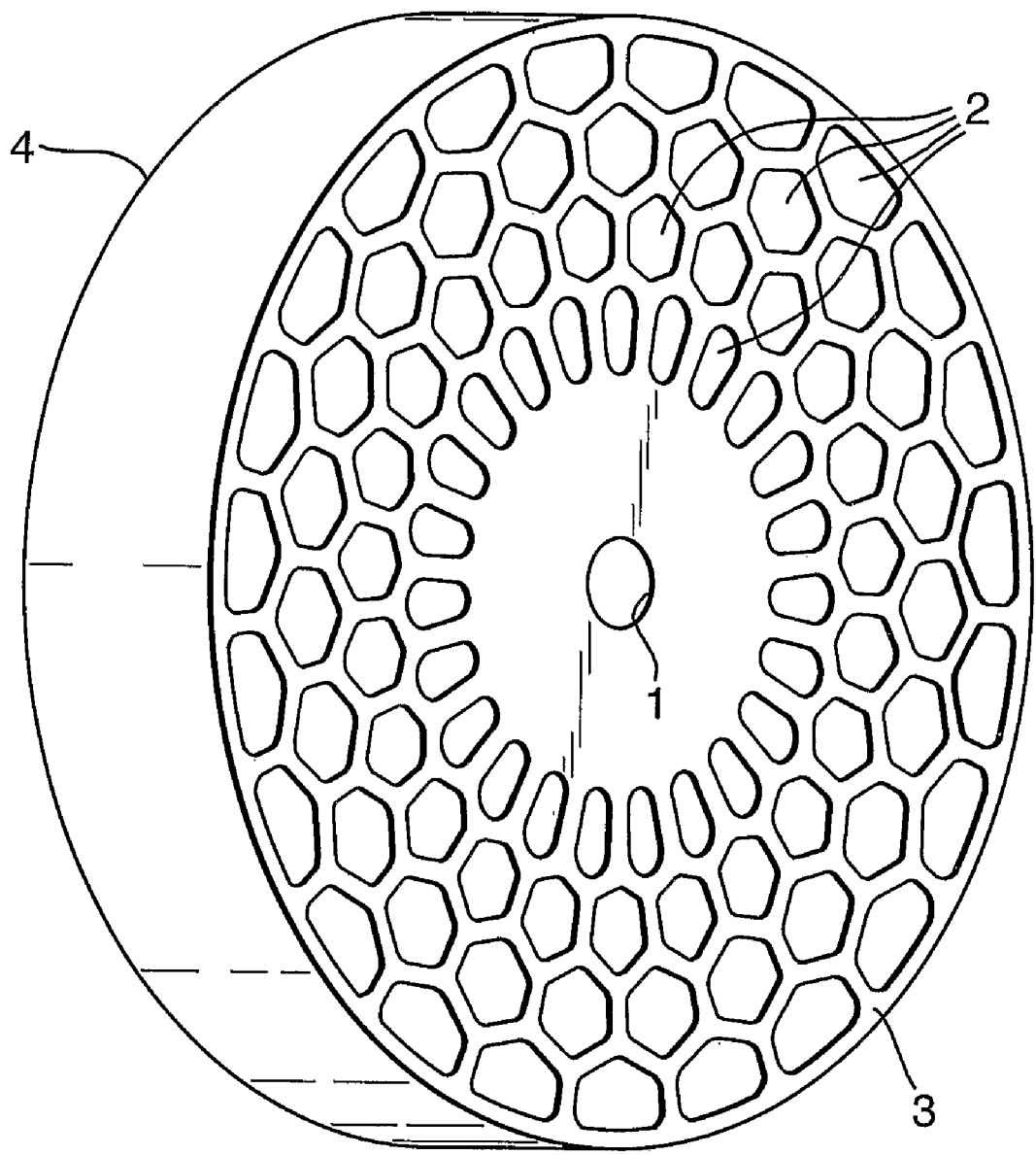
FIG. 1 is a pictorial view of a preferred embodiment of an axial flow fan impeller according to the invention, as viewed on its inlet face.
Figure 2:
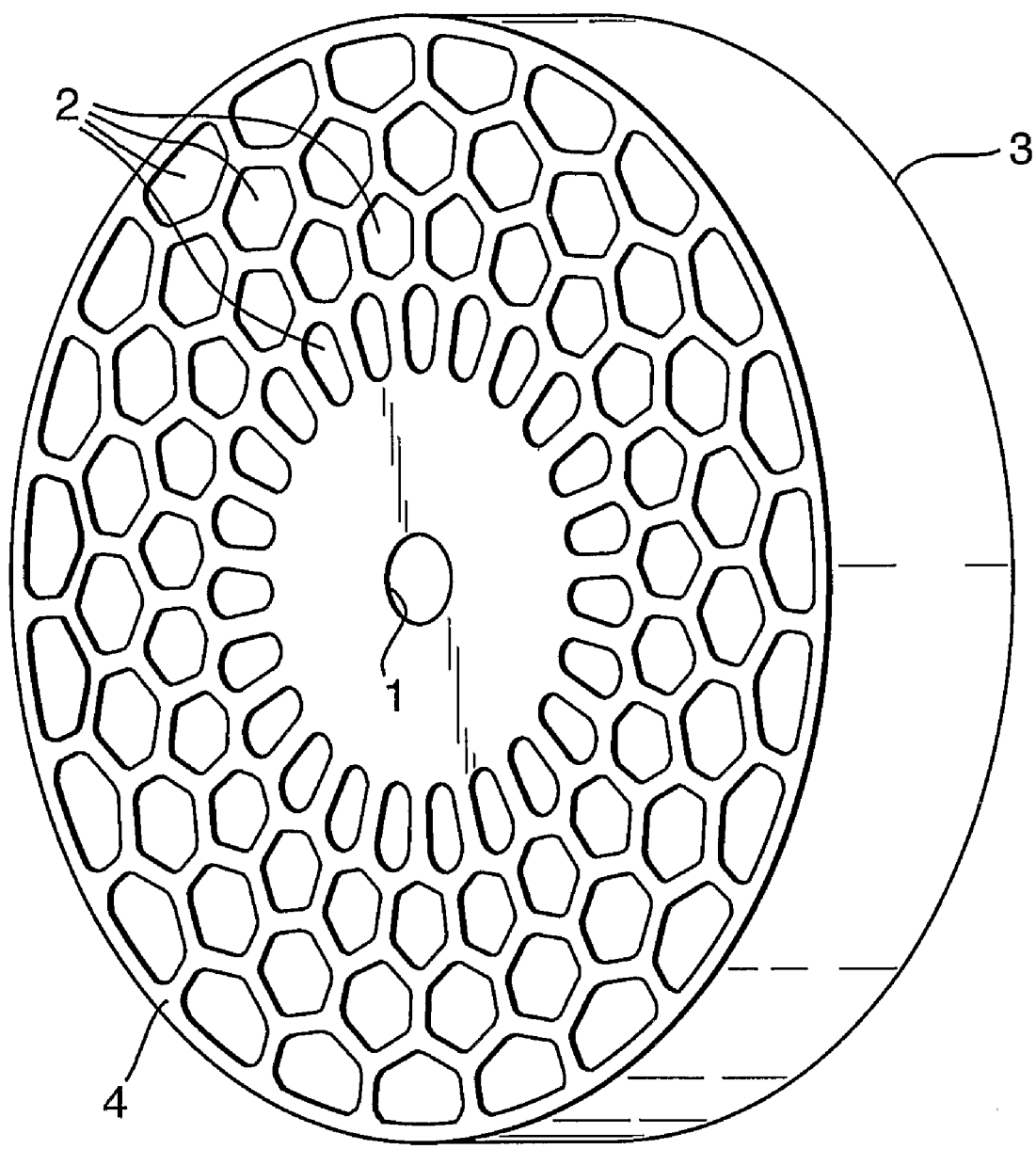
FIG. 2 is pictorial view of the impeller of FIG. 1 as viewed on its outlet face.

Referring to FIGS. 1 and 2, the impeller there illustrated is for an axial flow air fan or blower such as may be incorporated in a vacuum cleaner, hairdryer or the like appliance. It comprises a monolithic structure of cylindrical envelope with a central bore 1 adapted to be fitted onto the spindle of an associated motor (not shown) for rotating the impeller in use, and may be formed in a suitable plastics material eg by moulding, machining or stereo lithography. A multiplicity of air flow channels 2 extend through the impeller from the inlet face 3 viewed in FIG. 1 to the outlet face 4 viewed in FIG. 2 and when it is rotated induce a flow of air to pass generally axially thorough the duct or casing (not shown) in which the impeller is, in use, disposed.

More particularly, in the illustrated embodiment there are a total of 92 channels 2 disposed in an array of four coaxial rings of 23 channels each. The individual channels are of generally hexagonal cross-section, truncated to five sides for the channels in the radially innermost and outermost rings, and tessellated as shown so that the centres of the channels in each ring are offset in the circumferential direction from the centres of those in the adjoining ring or rings by a half channel width. In this respect the shapes and sizes of the channels in each successive ring are modified as compared to a standard "honeycomb" structure of regular hexagons to (i) account for the different radii of the rings while maintaining the same number of channels in each ring, (ii) provide side faces in each channel envelope which extend radially with respect to the axis of rotation of the impeller, and (iii) achieve a practically constant wall thickness between all adjoining channels.

Figure 3:
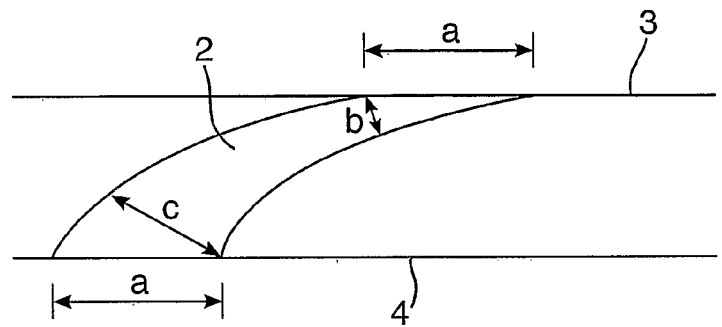
FIG. 3 is a simplified schematic diagram illustrating the increase in flow area due to the aerodynamic form of a typical flow channel of the impeller of FIGS. 1 and 2.

Each channel 2 has a component of curvature in the circumferential direction of the impeller in accordance with the required aerodynamic form to induce axial flow through the impeller, with the consequence that each channel outlet seen in FIG. 2 is offset circumferentially to some degree from the respective channel inlet seen in FIG. 1. The typical channel profile in this sense is depicted in FIG. 3, which is a schematic projected (flattened) section through a circumferential portion of the impeller showing a single channel 2 extending from the inlet face 3 to the outlet face 4. It is seen that the degree of curvature of the channel in this view increases towards the outlet end so that, while the circumferential widths of the inlet and outlet at the axially opposite faces of the impeller may be equal (dimension a), the "true" cross-sectional area of the channel available for flow (i.e. area normal to the centerline of the channel) increases along its length as can be seen by comparison of the dimensions b and c. This assists deceleration and compression of the air as it flows through the channel.

Figure 4:
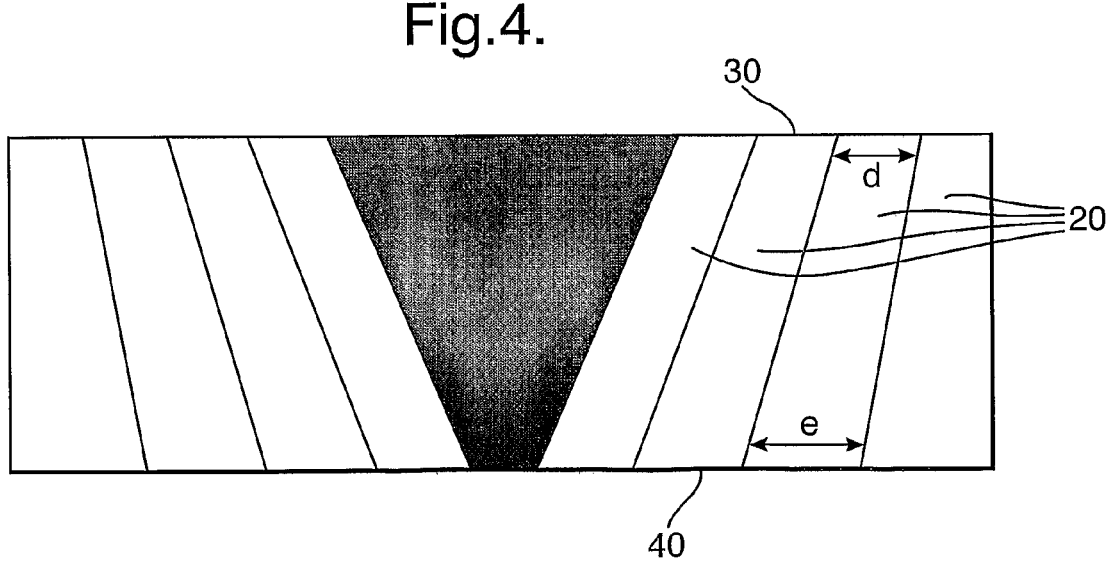
FIG. 4 is a simplified schematic diagram illustrating the additional increase in flow area of channels in a modified form of the impeller of FIGS. 1 and 2.

Although not featured in the impeller illustrated in FIGS. 1 and 2, an additional useful increase in the available flow area through the channels 2 can be achieved in accordance with the invention by simultaneously sweeping the channels inwards in the radial direction from the inlet to the outlet. This may be appreciated from the simplified representation in FIG. 3, which is a schematic radial cross-section through a modified impeller, showing channels 20 of adjoining rings extending from the inlet face 30 to the outlet face 40, but ignoring their circumferential staggering and curvature. From this it is seen that the centres of the respective channel outlets are offset in the radial direction from the centres of the respective channel inlets and that the dimension of each channel 20 in the radial direction—exemplified by the dimensions d and e at the inlet and outlet of a typical channel in FIG. 4—increases along the length of each channel.

While preferred embodiments of an axial flow impeller have been described above and illustrated in the accompanying drawings, those skilled in the art will appreciate that numerous variations may be made to the illustrated designs, for example in terms of the number, size and fluid dynamic form of the flow channels, to meet specific requirements and applications, without departing from the scope of the invention. For example having a prime number of channels in each ring becomes less important as the number increases (e.g. 100 or more). Furthermore the number of channels in each ring need not be the same e.g. if it is considered more important to have the individual channel cross-sectional areas the same in all rings.

The invention claimed is:

1. An axial flow impeller comprising a multiplicity of individual axial flow channels disposed in a circumferential and radial array with respect to the axis of rotation of the impeller, wherein the array of flow channels is in the form of a radial succession of coaxial rings of such channels, with the channels in each such ring being offset in the circumferential direction from the channels in the adjoining ring(s), and with the same number of channels in each such ring.

2. An impeller according to claim 1 wherein at least a plurality of said flow channels are of generally hexagonal cross-section.

3. An impeller according to claim 1 wherein at least a plurality of said flow channels are of generally quadrilateral cross-section.

4. An impeller according to claim 1 wherein said rings of flow channels tessellate in the radial direction.

5. An impeller according to claim 4 wherein there are at least three said rings of flow channels and the channels in at least that or those ring(s) which are not the radially innermost or outermost ring are of generally hexagonal cross-section.

6. An impeller according to claim 1 wherein the number of channels in each said ring is a prime number.

7. An axial flow impeller comprising a multiplicity of individual axial flow channels disposed in a circumferential and radial array with respect to the axis of rotation of the impeller, wherein at least a plurality of said channels are configured to extend from a respective channel inlet to a respective channel outlet which is offset from the respective inlet in the radial direction of the impeller, and involve an increase in the internal dimension of the respective channel in the direction radial to the axis of rotation of the impeller.

8. An impeller according to claim 7 wherein at least a plurality of said flow channels are of generally hexagonal cross-section.

9. An impeller according to claim 7 wherein at least a plurality of said flow channels are of generally quadrilateral cross-section.

10. An impeller according to claim 7 wherein the array of flow channels is in the form of a radial succession of coaxial rings of such channels, with the channels in each such ring being offset in the circumferential direction from the channels in the adjoining ring(s).

11. An impeller according to claim 10 wherein there are the same number of flow channels in each said ring.

12. An impeller according to claim 11 wherein said rings of flow channels tessellate in the radial direction.

13. An impeller according to claim 12 wherein there are at least three said rings of flow channels and the channels in at least that or those ring(s) which are not the radially innermost or outermost ring are of generally hexagonal cross-section.

14. An impeller according to claim 10 wherein the number of channels in each said ring is a prime number.

15. A fluid dynamic machine incorporating an impeller according to claim 1.

16. A fluid dynamic machine incorporating an impeller according to claim 7.

* * * * *